United States Patent
Clemente

Patent Number: 6,079,763
Date of Patent: Jun. 27, 2000

[54] FOLDABLE MULTI-POSITION AUTOMOTIVE VEHICLE SEAT

[75] Inventor: Carlos Alberto Clemente, St. Clair Shores, Mich.

[73] Assignee: Ford Global Technologies, Inc., Dearborn, Mich.

[21] Appl. No.: 09/073,307

[22] Filed: May 6, 1998

[51] Int. Cl.$^7$ .................................................. B60N 2/02
[52] U.S. Cl. ................................. 296/65.05; 296/65.09; 296/65.08; 248/430
[58] Field of Search ........................... 296/65.05, 65.09, 296/65.08, 65.13–65.16, 65.18, 65.17; 248/430

[56] References Cited

U.S. PATENT DOCUMENTS

| | | |
|---|---|---|
| 3,083,055 | 3/1963 | Davis . |
| 3,634,893 | 1/1972 | Hern et al. . |
| 3,973,799 | 8/1976 | Berg ........................................ 297/341 |
| 4,368,916 | 1/1983 | Blasin ..................................... 297/341 |
| 4,475,763 | 10/1984 | Hamatani et al. ....................... 297/378 |
| 4,484,776 | 11/1984 | Gokimoto et al. ...................... 297/379 |
| 4,543,675 | 10/1985 | Shrock . |
| 4,627,656 | 12/1986 | Gokimoto et al. ......................... 296/65 |
| 4,699,418 | 10/1987 | Plavetich ................................ 296/65 R |
| 4,756,034 | 7/1988 | Stewart . |
| 4,969,682 | 11/1990 | Gray . |
| 5,248,178 | 9/1993 | Brambilla ............................... 296/65.1 |
| 5,393,116 | 2/1995 | Bolsworth et al. ..................... 296/65.1 |
| 5,435,624 | 7/1995 | Bray et al. . |
| 5,498,051 | 3/1996 | Sponsler et al. ....................... 296/65.1 |
| 5,570,931 | 11/1996 | Kargilis et al. ........................ 296/65.1 |
| 5,593,208 | 1/1997 | Mitschelen et al. ................... 296/65.1 |
| 5,626,391 | 5/1997 | Miller et al. ........................... 296/65.1 |
| 5,634,686 | 6/1997 | Okazaki ................................. 296/65.1 |
| 5,662,368 | 9/1997 | Ito et al. ................................. 296/65.1 |
| 5,711,505 | 1/1998 | Nemoto ................................. 296/65.1 |
| 5,810,416 | 9/1998 | Hashimoto ............................ 296/65.01 |

*Primary Examiner*—Joseph D. Pape
*Assistant Examiner*—Kiran Patel
*Attorney, Agent, or Firm*—David B. Kelley

[57] ABSTRACT

A vehicle seat is provided having a back portion and a seat portion. A series of linkages are also provided which enable the back portion to fold forward against the horizontal seat portion. Once folded, the seat portion is then engaged to store in a forward direction. The seat movement may be powered by a single reversible motor or other power source.

17 Claims, 3 Drawing Sheets

FOLDABLE MULTI-POSITION AUTOMOTIVE VEHICLE SEAT

FIELD OF THE INVENTION

The present invention relates to an automotive vehicle seat, and more particularly to a foldable, multi-position vehicle seat.

BACKGROUND OF THE INVENTION

The popularity of today's sport utility vehicles has prompted new ways of increasing storage capacity. One such way is to fold, flip, or slide any un-utilized passenger seats in a temporary forward position. Typically, a stored position for a passenger seat amounted to manually folding a back portion of the vehicle seat forward, thereby permitting storage of cargo on top of the folded vehicle seat. More advanced designs have included independent actuations of folding the back portion down and sliding a horizontal seat portion forward.

Unfortunately, the typical manual operation of storing not only the back portion of a seat, but also the horizontal seat portion, required an independent two step process. This process was not intuitive. In order to move the seat, one had to first locate the release handle or lever, often out of view, along with determining whether to push or pull. This process was very frustrating. Frustration with cumbersome seat actuation designs could be compounded if the user has limited physical ability.

SUMMARY OF THE INVENTION

The present invention provides an occupant vehicle seat with a back portion that moves from an upright position to a folded position, and a seat portion rotatable between a horizontal position and a stored position. The back portion pivots in relation to the seat portion by means of a pivoting bracket, and the seat portion rotates in relation to the vehicle structure by means of a floor guide mechanism.

The present invention further includes a stationary track which is rigidly fixed to the seat portion. The track has a forward stop end which defines the folded position, and a rearward stop end which defines the upright position. A series of connected linkages are slideably engaged in the track with one end, linkage back portion end, pivotally connected to the back portion and a second end, free link second end, pivotally connected to an armature.

The armature may further be connected to a rotational shaft so that the free link second end is either pushed or pulled by the armature as the shaft rotates. The shaft can be powered by numerous means, including a reversible motor with a remote switch, or a hand crank.

Thus, the advantage of the present invention is a seat which can be stored in both a folded position and a stored position by actuation of a single device, such as a remote switch located in plain view on a vehicle door. Utilization of a motor eliminates the difficulties found with previous, non-intuitive, mechanical devices which required manual operation.

BRIEF DESCRIPTION OF THE DRAWINGS

These and other objects, advantages, and features of the present invention will be apparent to those skilled in the vehicle seat arts upon reading the following description with reference to the accompanying drawings, in which.

DETAILED DESCRIPTION OF THE PREFERRED EMBODIMENTS

Figure 1:
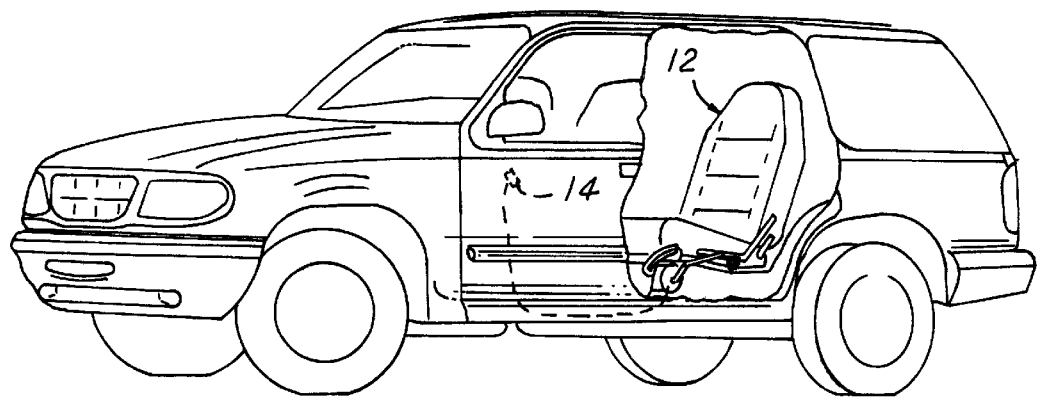
FIG. 1 is a foldable, multi-position seat according to the present invention shown in an automotive vehicle.

Referring now to the drawings, and in particular to FIG. 1 thereof, an automotive vehicle is shown with an occupant seat 12 therein. A remote switch 14 for operation of seat 12 is provided and may be located anywhere within the vehicle.

Figure 2:
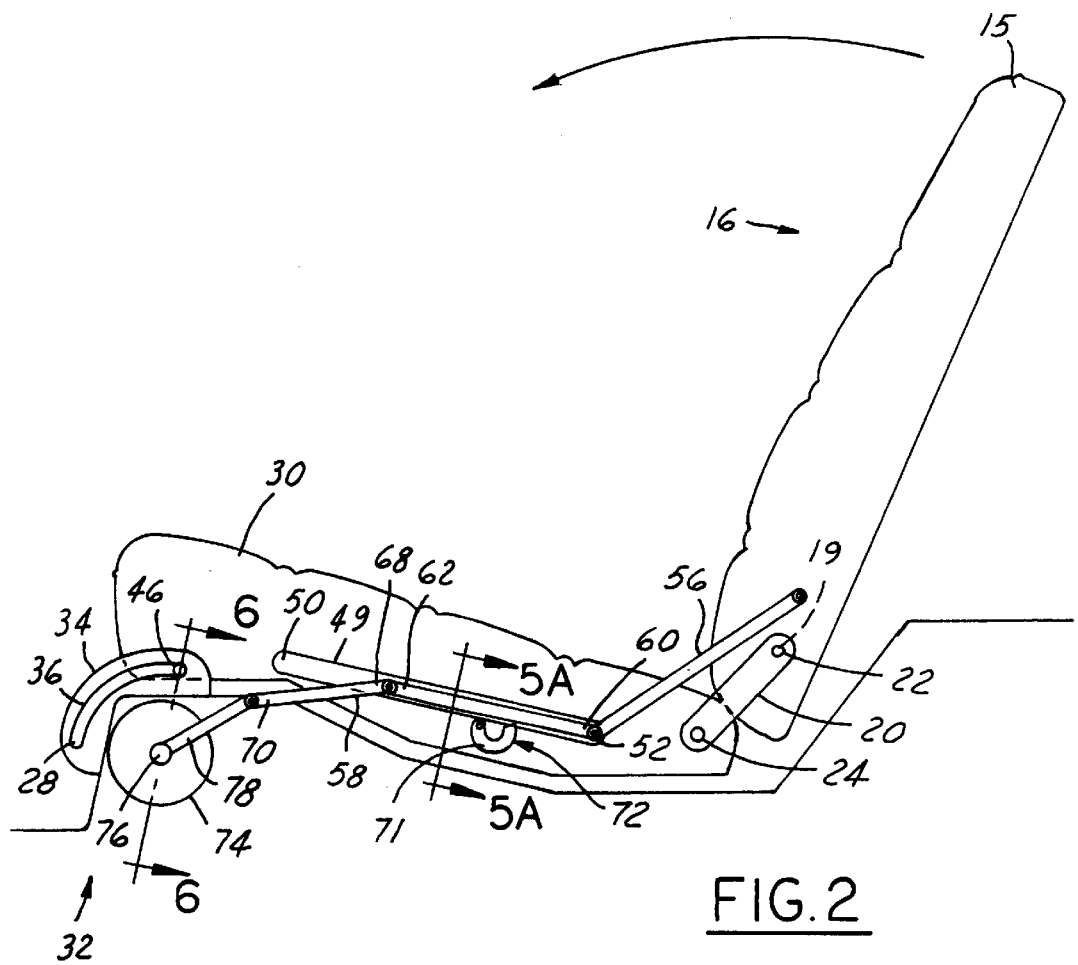
FIG. 2 is the vehicle seat in an upright position.

Vehicle seat 12 has a back portion 15 which is moveable from a generally upright position 16 (FIG. 2) to a forward folded position 18 (FIG. 3) relative to a seat portion 30 and about a folding axis 19. Movement of back portion 15 is accomplished about two brackets 20, where each bracket 20 has a pivotal point 22, in-line with folding axis 19, and at least one fixed point 24. As shown in FIG. 2, pivotal point 22 is in conjunction with back portion 15, and at least one fixed point 24 is rigidly attached to seat portion 30. However, pivotal point 22 and at least one fixed point 24 may be reversed, or pivotal point 22 may be centered on bracket 20, thereby having at least one fixed point 24 located at both seat portion 30 and back portion 15.

Figure 3:
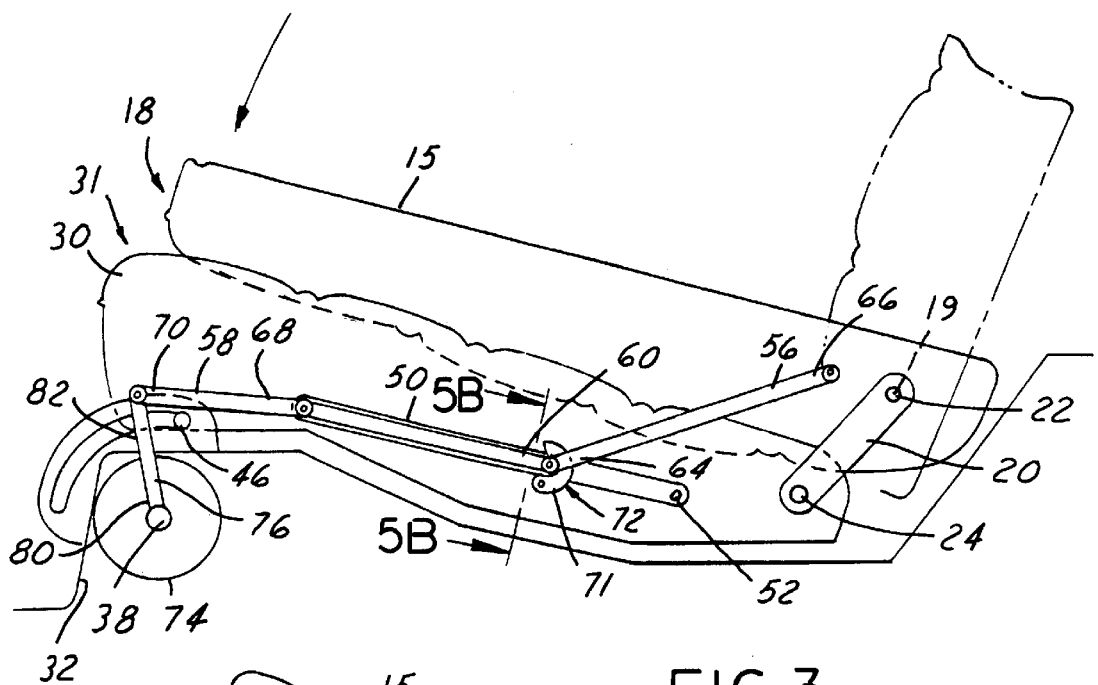
FIG. 3 is the vehicle seat in a folded position.
Figure 4:
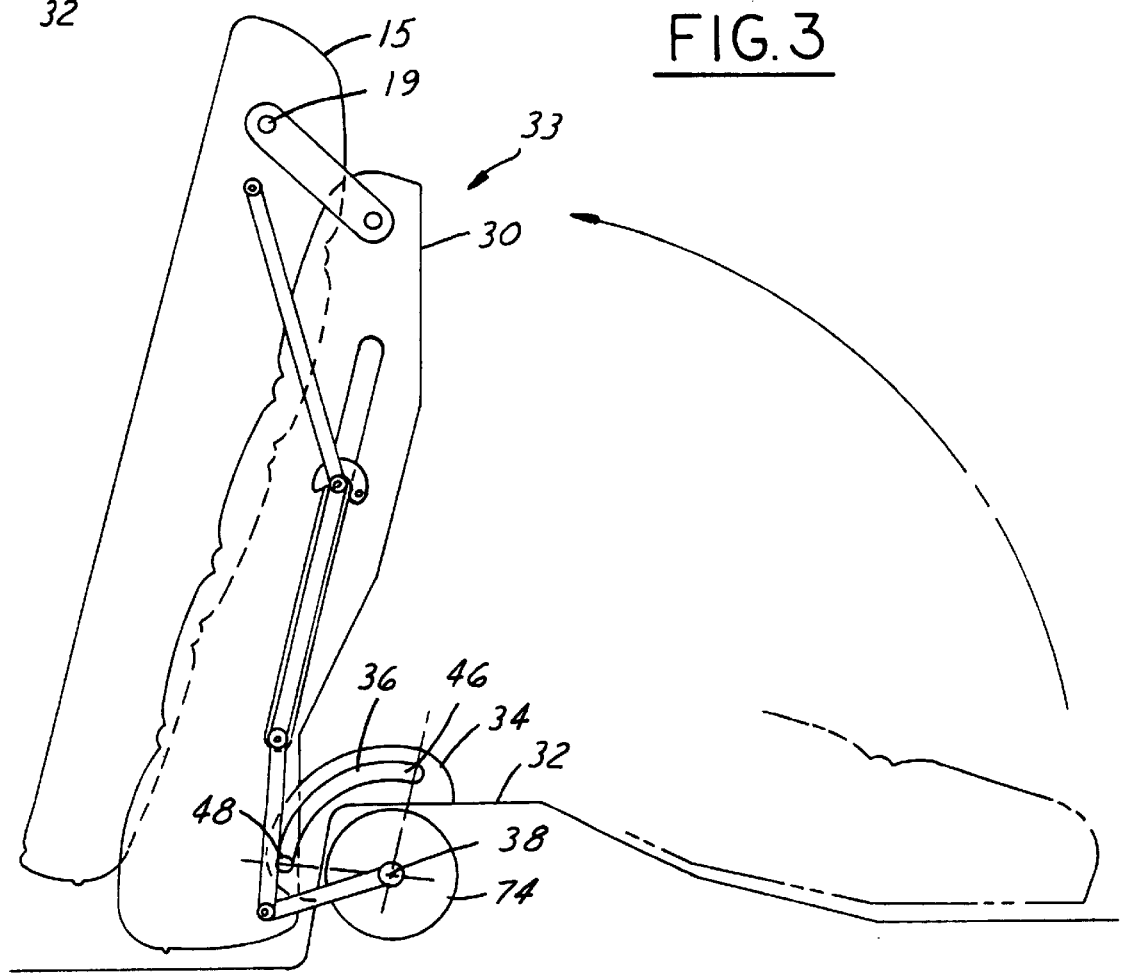
FIG. 4 is the vehicle seat in a stored position.
Figure 6:
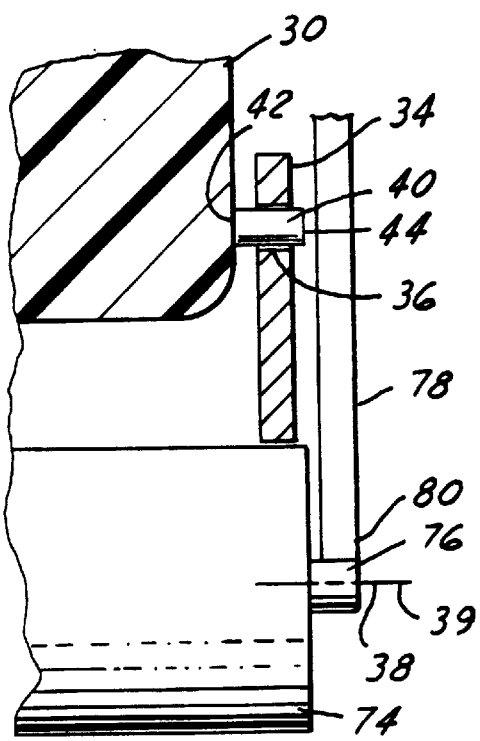
FIG. 6 is a front view of a floor guide mechanism in conjunction with a reversible motor.

Seat portion 30 is moveable from a generally horizontal position 31 (FIG. 3) to a stored position 33 (FIG. 4). Seat portion 30 is also rotatably and slideably secured to a floor guide mechanism 34 which is mounted, directly or indirectly, to a vehicle frame 32 (FIG. 2). As shown in FIG. 4, the rotation of seat portion 30 occurs about seat rotating axis 38 which is substantially parallel to folding axis 19. And, floor guide mechanism 34 has a slot 36 concentrically located about seat rotating axis 38 (FIG. 6). Referring further to FIG. 6, pin 40 has a pin first end 42, which is rigidly and normally mounted to seat portion 30, and a pin second end 44 which is guided through slot 36. Slot 36 and pin 40 provide the necessary structural integrity which permits seat portion 30 to rotate relative to vehicle frame 32 about seat rotating axis 38. Range of rotation is restricted by pin 40 as it travels from a slot first end 46 (FIG. 3) to a slot second end 48 (FIG. 4).

Referring to FIG. 2, a stationary track 49 is rigidly fixed to seat portion 30 such that it is contained within a substantially parallel plane to that of slot 36. Track 49 has a forward stop end 50 and a rearward stop end 52. Traveling within track 49 is a restricted-link 54.

Restricted-link 54 provides a pivotal connection means between a linkage 56 and a free-link 58. In order to provide this connection means and travel within track 49, restricted-link 54 may take the form of two different embodiments. The first embodiment is a simple pin connection (not shown) providing the pivotal means between linkage 56 and free-link 58, along with the slideable connection with track 49. The second embodiment of restricted-link 54 is an actual linkage having a prescribed length with a restricted-link first end 60 and a restricted-link second end 62 (FIG. 2).

As shown in FIG. 3, linkage 56 has a linkage track end 64 pivotally connected to restricted-link first end 60, and a linkage back portion end 66 which is pivotally secured to back portion 15. When linkage track end 64, along with restricted-link first end 60, slides rearward and meets rearward stop end 52 (FIG. 2), back portion 15 is in upright position 16.

Figure 5B:
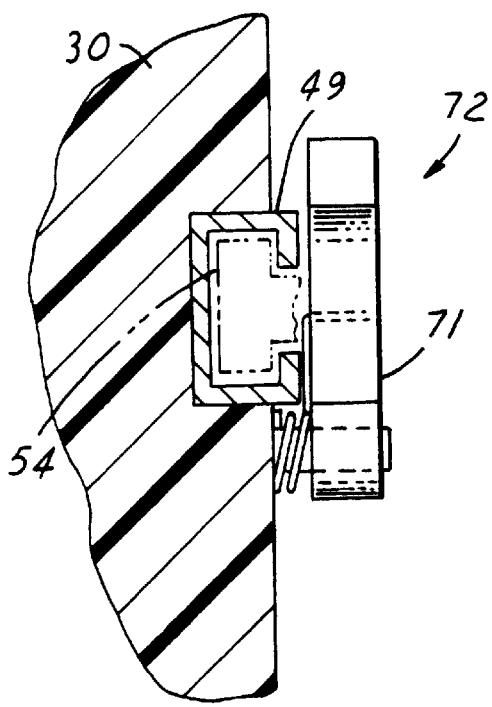
FIG. 5B shows a front view of a folded position restraining mechanism in an engaged position.
Figure 5A:
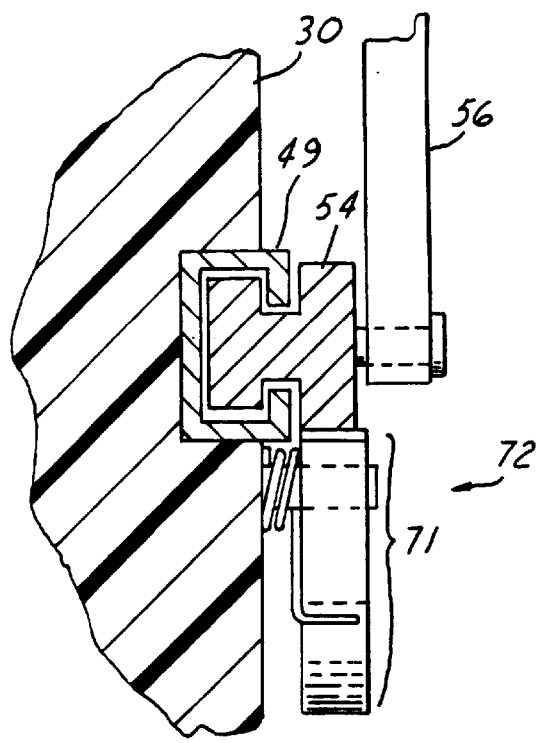
FIG. 5A shows a front view of a folded position restraining mechanism in a disengaged position.

Free-link 58 has a free-link first end 68 pivotally connected to restricted-link second end 62. When free-link first end 68, along with restricted link second end 62, slides forward and meets forward stop end 50, back portion 15 is in folded position 18 (FIG. 3) and seat portion 30 begins to move from generally horizontal position 31 to stored position 33 (FIG. 4). In addition, a folded position restraining mechanism 71 will spring from a disengaged position 72 (FIG. 5B) to an engaged position 73 (FIG. 5A), thereby engaging restricted-link first end 60 (FIG. 3). As depicted in FIG. 5A & 5B, such engagement may be accomplished by a spring loaded hook which is biased toward engagement.

With linkages 56, 54, & 58 outlined above, a wide assortment of push/pull means may be exerted upon a free-link second end 70 of free-link 58. One such means may be that of a rotational device like a hand crank (not shown) or a reversible motor 74 (FIG. 2). Reversible motor 74, or any rotational device, has a rotational centerline 39 (FIG. 6) about which a shaft 76 rotates. An armature 78 has an armature first end 82 pivotally connected to free-link second end 70 and an armature second end 80 normally and rigidly connected to shaft 76 (FIG. 3).

In operation and presuming back portion 15 is in upright position 16 (FIG. 2), a counter-clockwise rotation of shaft 76 pivots back portion 15 into folded position 18 (FIG. 3) where folded position restraining mechanism 71 moves from disengaged position 72 to engaged position 73. As shaft 76 continues to rotate counter-clockwise, seat portion 30 departs from horizontal position 31, and taking back portion 15 with it, rotates into stored position 33 (FIG. 4). Counter-clockwise rotation of shaft 76 will then stop when pin 40 strikes slot second end 48.

Presuming seat portion 30 is in stored position 33, clockwise rotation of shaft 76 will rotate seat portion 30 into horizontal position 31, where pin 40 strikes slot first end 46. Once struck, continued clockwise rotation of shaft 76 will transmit a force against folded position restraining mechanism 71 which will then leave engaged position 73 and settle in disengaged position 72. With folded position restraining mechanism 71 in disengaged position 72, back portion 15 may then pivot from folded position 18 to upright position 16. Clockwise rotation of shaft 76 will then stop when restricted-link first end 60 strikes rearward stop end 52.

With the present invention, an occupant of an automotive vehicle may, by a simple pressing of multi-positional remote switch 14, automatically store or un-store occupant seat 12. This switch can potentially be in the form of a keypad which includes three pads reading "stored," "folded," and "upright" positions. Pressing any one pad puts the seat into the chosen position.

Although the preferred embodiments of the present invention have been disclosed, various changes and modifications may be made thereto by one skilled in the art without departing from the scope and spirit of the invention as set forth in the appended claims.

What is claimed is:

1. An occupant vehicle seat comprising:
   a back portion moveable between a generally upright position and a forward folded position;
   a seat portion having a generally horizontal position which receives the back portion thereon when the back portion is in the forward folded position, and a generally vertical stored position wherein the seat portion and the back portion, while in the folded position, are only together moveable to the generally vertical stored position;
   at least one bracket pivotally connecting the seat portion with the back portion so that the back portion pivots with respect to the stationary seat portion; and
   at least one floor guide mechanism rigidly mounted to a vehicle frame, the at least one floor guide mechanism including:
      a slot concentrically located about a seat rotating axis; and
      a pin having a pin first end rigidly and normally mounted to the seat portion and a pin second end guided within the slot so that the vehicle seat rotates relative to the vehicle frame, about the seat rotating axis, as the pin is guided along the slot.

2. An occupant vehicle seat as set forth in claim 1 including a power means for storing and un-storing the vehicle seat.

3. An occupant vehicle seat as set forth in claim 2 further including:
   a stationary track rigidly fixed to the seat portion, the track having a forward stop end and a rearward stop end; and
   a linkage mechanism guided by the stationary track.

4. An occupant vehicle seat as set forth in claim 3 wherein the linkage mechanism includes:
   a linkage having a linkage track end slideably engaged within the track, and a linkage back portion end pivotally secured to the back portion;
   a restricted-link confined to movement within the track, the restricted-link having a restricted-link first end pivotally connected to the linkage track end and a restricted-link second end; and
   a push/pull mechanism pivotally secured to the restricted-link second end.

5. An occupant vehicle seat as set forth in claim 4 wherein the push/pull mechanism comprises:
   a free-link having a free-link first end pivotally connected to the restricted-link second end and a free-link second end;
   an armature having an armature first end pivotally connected to the free-link second end and an armature second end; and
   a rotational shaft rigidly and normally secured to the armature second end and operatively engaged with the power means, wherein the power means is a reversible motor.

6. An occupant vehicle seat as set forth in claim 2 wherein the power means includes a remote switch to allow power from a power source to the power means.

7. An occupant vehicle seat as set forth in claim 4 further including a folded position restraining mechanism having an open hook member pivotally hinged to the seat portion so that the hook member is biased to hook about the restricted-link first end when the restricted-link second end is at the forward stop end.

8. An occupant vehicle seat as set forth in claim 5 wherein the shaft has a rotational centerline which is in-line with the rotating axis.

9. An occupant vehicle seat comprising:
   a back portion movable between a generally upright position and a forward folded position;
   a seat portion movable from a generally horizontal position to a stored position;
   connection means for interconnecting the back portion to the seat portion to allow the back portion to pivot relative to the seat portion between the upright position and the folded position;

back portion folding means for alternately placing the back portion in the upright position and the folded position;

vehicle seat rotating means for alternately placing the seat portion and the folded back portion in the horizontal position and the stored position;

folding power means for operatively and consecutively engaging, first, the back portion folding means to place the back portion in the forward position, and second, the vehicle seat storing means to place the seat portion in the stored position, in response to a first operator input; and unfolding power means for operatively and consecutively engaging, first, the vehicle seat storing means to place the seat portion from the stored position to the horizontal position, and second, the back portion folding means to place the back portion from the folded position to the upright position, in response to a second operator input.

10. An occupant vehicle seat as set forth in claim 9 wherein the folding power means and the unfolding power means is a single reversible rotating shaft having rotating means.

11. An occupant vehicle seat as set forth in claim 10 wherein the rotating means is a reversible motor.

12. An occupant vehicle seat as set forth in claim 9 wherein the power means includes a remote switch to allow power from a power source to the power means.

13. An occupant vehicle seat as set forth in claim 9 including folded position restraining means for securing the vehicle seat in the folded position while the seat portion travels from the stored position to the horizontal position.

14. An occupant vehicle seat as set forth in claim 9 wherein the connection means is at least one bracket pivotally connecting the seat portion with the back portion.

15. An occupant vehicle seat as set forth in claim 9 wherein the back portion folding means comprises:

a stationary track rigidly fixed to the seat portion, the track having a forward stop end, an intermediate track position, and a rearward stop end;

a linkage having a linkage track end slideably engaged within the track, and a linkage back portion end pivotally secured to the back portion;

linkage track end pulling means for pulling the linkage track end along the track so that the back portion moves from the upright position to the folded position when the linkage track end is pulled towards the forward stop end and reaches the intermediate track position; and linkage track end pushing means for pushing the linkage track end from the intermediate track position to the rearward stop end so that the back portion respectively pivots from the folded position to the upright position.

16. An occupant vehicle seat as set forth in claim 15 wherein the linkage track end pulling means and the linkage track end pushing means includes:

a restricted-link confined to movement within the track and pivotally connected to the linkage track end;

a free-link having a free-link first end pivotally connected to the restricted link and a free-link second end;

an armature having an armature first end pivotally connected to the free-link second end and an armature second end; and a rotational shaft rigidly and normally secured to the armature second end, the rotational shaft having a clockwise rotation and a counter-clockwise rotation.

17. An occupant vehicle seat as set forth in claim 9 wherein the vehicle seat rotating means comprises:

a stationary track rigidly fixed to the seat portion, the track having a forward stop end, an intermediate track position, and a rearward stop end;

a free-link having a free-link first end pivotally connected to the restricted link and a free-link second end;

an armature having an armature first end pivotally connected to the free-link second end and an armature second end;

a rotational shaft rigidly and normally secured to the armature second end, the rotational shaft having a clockwise rotation and a counter-clockwise rotation;

at least one floor guide mechanism rigidly mounted to a vehicle frame, where the at least one floor track guide mechanism includes a slot concentrically located about a rotating axis about which the seat portion rotates; and a pin having a first pin end rigidly secured to the seat portion and a second pin end extending through the slot.

* * * * *